United States Patent [19]
Emambakhsh et al.

[11] Patent Number: 5,588,667
[45] Date of Patent: Dec. 31, 1996

[54] VEHICLE OCCUPANT RESTRAINT APPARATUS AND METHOD OF ASSEMBLY

[75] Inventors: Al S. Emambakhsh, Flat Rock; Michael P. Pionk, Marysville; Al A. Saberan, New Baltimore; John P. Wallner, Rochester, all of Mich.

[73] Assignee: TRW Vehicle Safety Systems Inc., Lyndhurst, Ohio

[21] Appl. No.: 315,590

[22] Filed: Sep. 30, 1994

[51] Int. Cl.$^6$ .................................................. B60R 21/16
[52] U.S. Cl. ...................................... 280/728.2; 280/732
[58] Field of Search ......................... 280/728 R, 728 A, 280/728 B, 731, 732; 220/690, 615, 618, 620, 617

[56] References Cited

U.S. PATENT DOCUMENTS

| | | | |
|---|---|---|---|
| 613,343 | 11/1898 | Westerfield | 220/690 |
| 2,848,134 | 8/1958 | Carlson | 220/690 |
| 3,930,664 | 1/1976 | Parr et al. | 280/732 |
| 4,153,273 | 5/1979 | Risko | 280/740 |
| 4,191,392 | 3/1980 | Barnett | 280/740 |
| 4,941,678 | 7/1990 | Lauritzen et al. | 280/732 |
| 5,058,919 | 10/1991 | Paquette et al. | 280/732 |
| 5,062,664 | 11/1991 | Bishop et al. | 280/728 A |
| 5,069,480 | 12/1991 | Good | 280/743 R |
| 5,201,541 | 4/1993 | Jones et al. | 280/731 |
| 5,257,815 | 11/1993 | Bachelder et al. | 280/728 A |
| 5,261,693 | 11/1993 | Krickl et al. | 280/732 |
| 5,332,256 | 7/1994 | Lauritzen et al. | 280/728 A |
| 5,387,009 | 2/1995 | Lauritzen et al. | 280/732 |

FOREIGN PATENT DOCUMENTS

| | | | |
|---|---|---|---|
| 0602796 | 6/1994 | European Pat. Off. | 280/728 A |
| 828220 | 1/1952 | Germany | 220/690 |

*Primary Examiner*—Paul N. Dickson
*Attorney, Agent, or Firm*—Tarolli, Sundheim, Covell, Tummino & Szabo

[57] ABSTRACT

A vehicle occupant restraint apparatus (10) includes a canister (14), an inflator (18), and a restraint assembly (20). The canister (14) has a plurality of tabs (58), a chamber (70), a side opening (62), and a deployment opening (72). The inflator (18) is movable to an installed position in the chamber (70) in a first direction through the side opening (62). The restraint assembly (20) includes an air bag (22) which is expandable from the deployment opening (72) in a second direction perpendicular to the first direction upon inflation of the air bag (22) when the restraint assembly (20) is in an installed position engaged with the canister (14). Cooperating structures (48, 50, 52, 54) guide movement of the restraint assembly (20) to its installed position in sliding contact with the canister (14) in a third direction perpendicular to the second direction. A closure wall (140) has a closed position blocking movement of the inflator (18) and the restraint assembly (20) from their installed positions. The tabs (58) on the canister (14) are receivable through slots (158) in the closure wall (140) and are bendable into fastening positions in which they retain the closure wall (140) in the closed position.

2 Claims, 4 Drawing Sheets

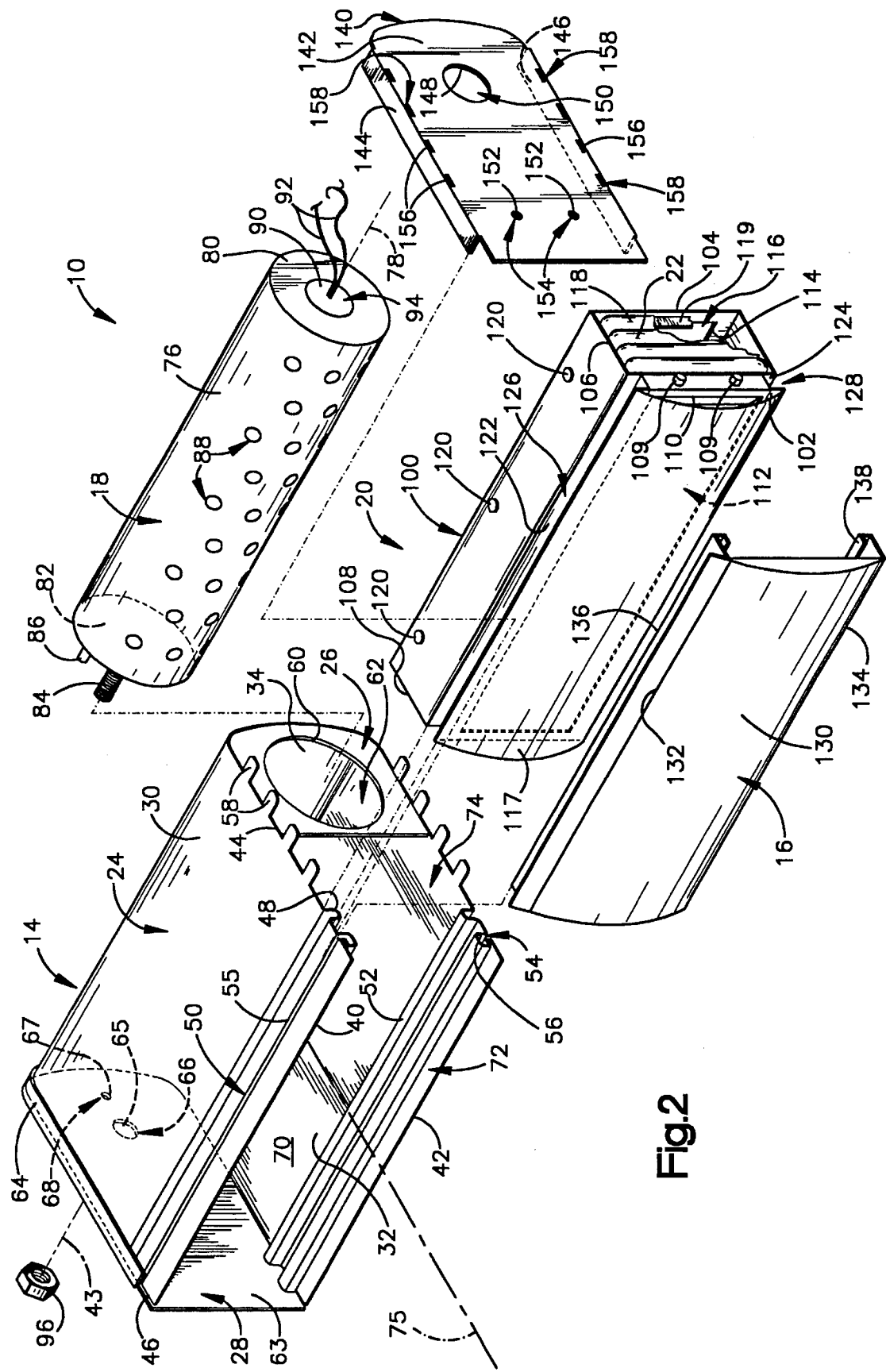

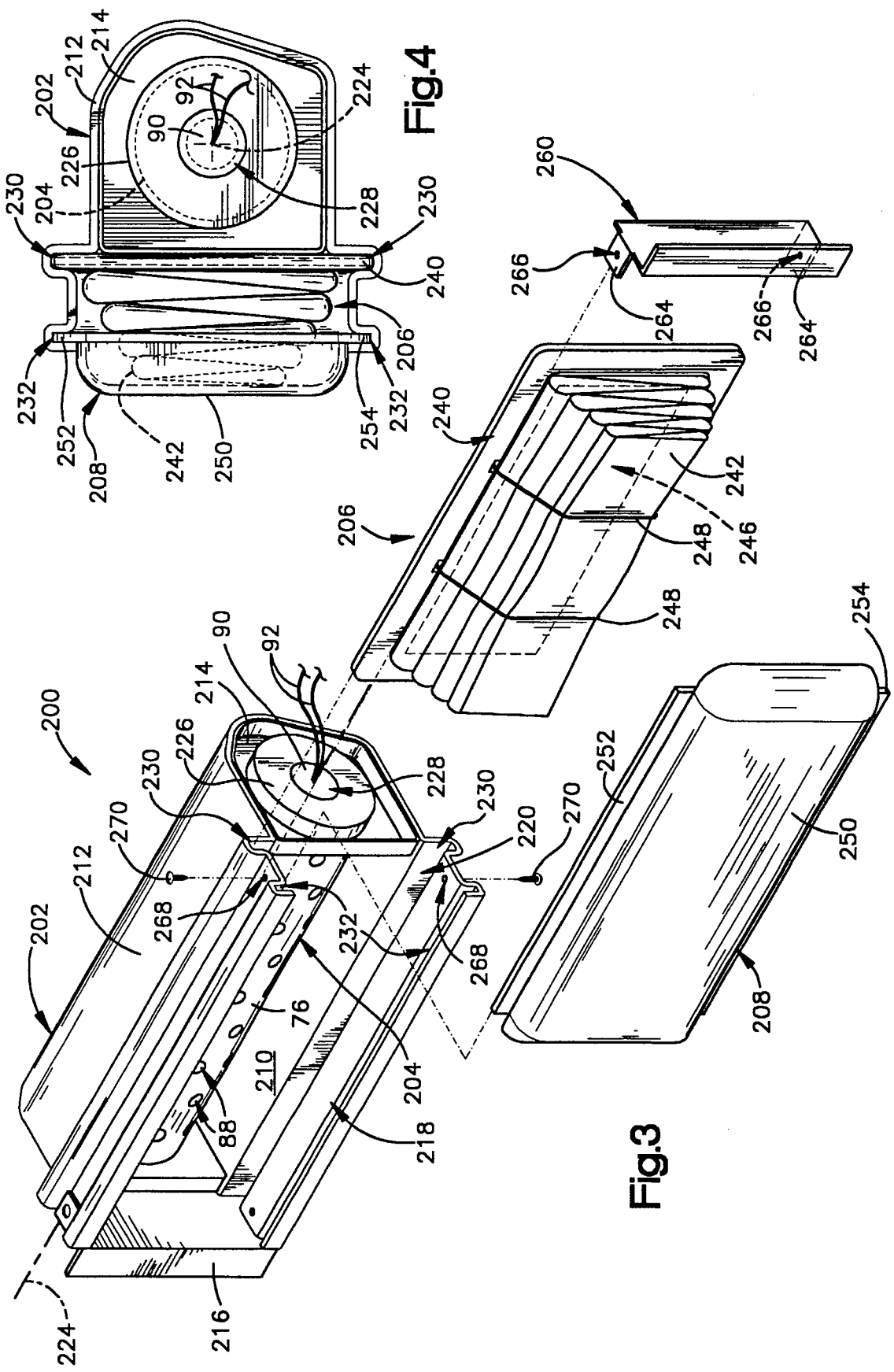

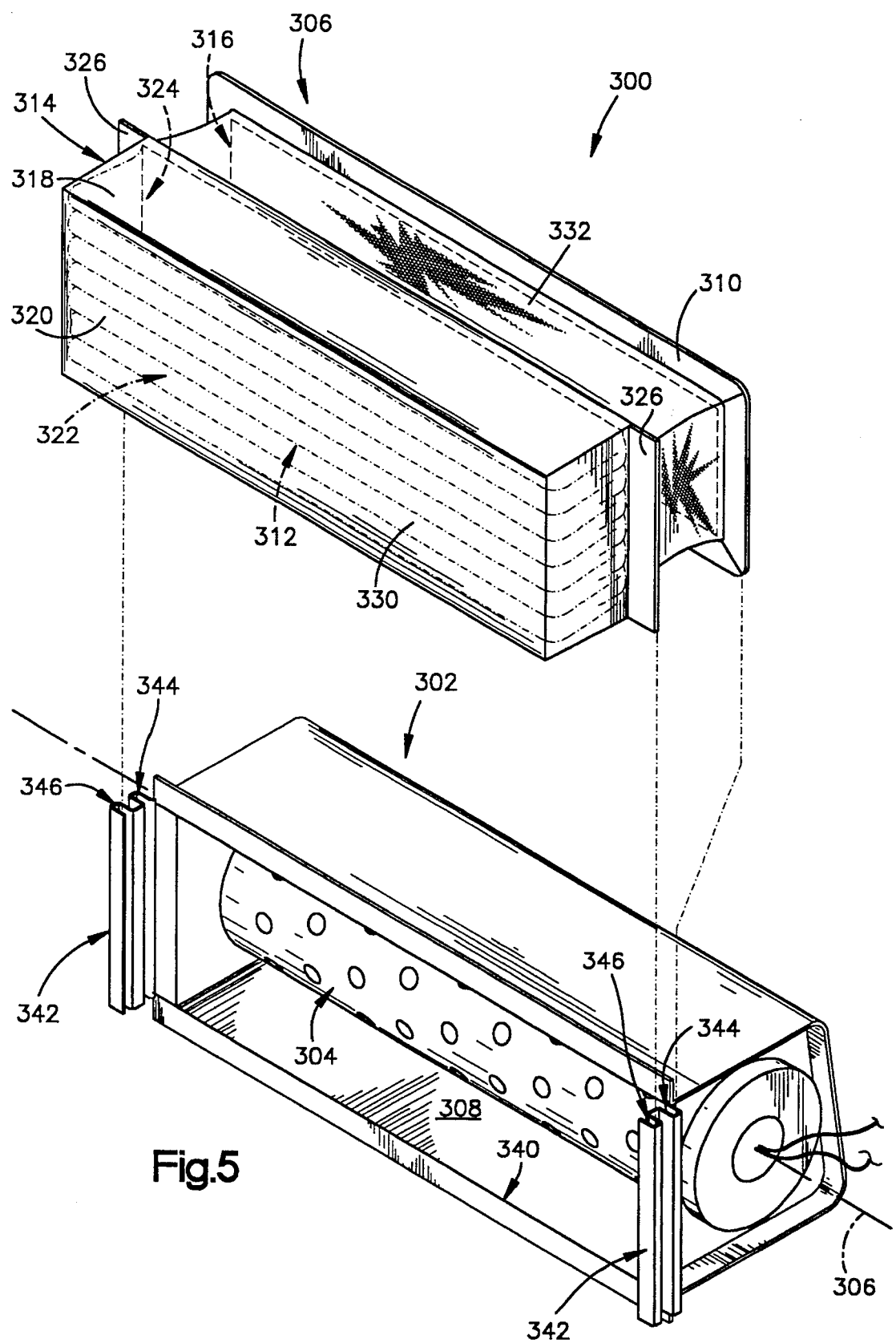

VEHICLE OCCUPANT RESTRAINT APPARATUS AND METHOD OF ASSEMBLY

FIELD OF THE INVENTION

The present invention relates to an apparatus for restraining an occupant of a vehicle. The present invention particularly relates to an apparatus comprising an air bag module, and to a method of assembling the module.

BACKGROUND OF THE INVENTION

An inflatable vehicle occupant restraint, such as an air bag, is inflated upon the occurrence of a vehicle collision. Inflation fluid is directed to flow from a source of inflation fluid into the air bag to inflate the air bag. The inflation fluid inflates the air bag from a stored, folded condition to an inflated condition in which the air bag extends into the vehicle occupant compartment. When the air bag in inflated into the vehicle occupant compartment, it restrains an occupant of the vehicle from forcefully striking parts of the vehicle.

The air bag is stored in an air bag module which is mounted in the vehicle. In addition to the air bag, the air bag module contains an inflator which comprises the source of inflation fluid for inflating the air bag. Typically, an air bag module also includes a reaction canister which contains the air bag and the inflator. The reaction canister is mounted in the vehicle, such as in the instrument panel of the vehicle, and is covered by a deployment door which opens upon inflation of the air bag.

SUMMARY OF THE INVENTION

In accordance with the present invention, a vehicle occupant restraint apparatus comprises a canister, an inflator structure, and a restraint assembly. The canister has means for defining bendable tab, a chamber, a side opening, and a deployment opening. The side opening faces outward from the chamber in a first direction. The deployment opening faces outward from the chamber in a second direction perpendicular to the first direction. The inflator structure has means for directing inflation fluid into the chamber, and is movable to an installed position in the chamber from the first direction through the side opening.

The restraint assembly includes an inflatable vehicle occupant restraint and support means for supporting the restraint in fluid communication with the inflator structure. The restraint assembly has an installed position engaged with the canister. When the restraint assembly is in the installed position, the restraint is expandable from the deployment opening in the second direction upon inflation of the restraint. The canister and the support means have cooperating means for guiding movement of the restraint assembly to the installed position in sliding contact with the canister in a third direction perpendicular to the second direction.

The apparatus further includes a closure wall having means for defining a slot. The closure wall has a closed position in which it blocks movement of the inflator structure and the restraint assembly from their installed positions. The tab on the canister is receivable through the slot in the closure wall, and is bendable into a fastening position in which it retains the closure wall in the closed position.

In a preferred embodiment of the present invention, the support means comprises a support frame for supporting the restraint in a folded, uninflated condition at a location outside the canister. The cooperating means includes a tongue on the canister and a groove on the support frame, each of which is elongated in the third direction. The canister further has means for defining an additional side opening. The restraint assembly is movable to its installed position through the additional side opening, with such movement of the restraint assembly being guided by the tongue and the groove. A plurality of tabs are included on the canister, and each tab is receivable through a respective slot in the closure wall. When the closure wall is retained in the closed position by the tabs, it blocks the inflator structure and the restraint assembly from moving outward through the side openings in the canister.

In the preferred embodiment of the invention, the apparatus further comprises a cover with means for defining a deployment door. The cover is engagable with the canister in a position in which the deployment door extends over the deployment opening. The cover and the canister have additional cooperating means for guiding the cover to move to that position in sliding contact with the canister in the same direction that the restraint assembly is moved to its installed position. The closure wall also blocks removal of the cover when the closure wall is retained in the closed position by the tabs.

BRIEF DESCRIPTION OF THE DRAWINGS

Further features of the present invention will become apparent to those skilled in the art to which the present invention relates from reading the following description with reference to the accompanying drawings, in which:

FIG. 2 is an exploded view of the apparatus of FIG. 1;

FIG. 3 is a partially exploded view of a vehicle occupant restraint apparatus comprising a second embodiment of the present invention;

FIG. 4 is an end view of parts of the apparatus of FIG. 3; and

FIG. 5 is a partially exploded view of a vehicle occupant restraint apparatus comprising a third embodiment of the present invention.

DESCRIPTION OF PREFERRED EMBODIMENTS

Figure 1:
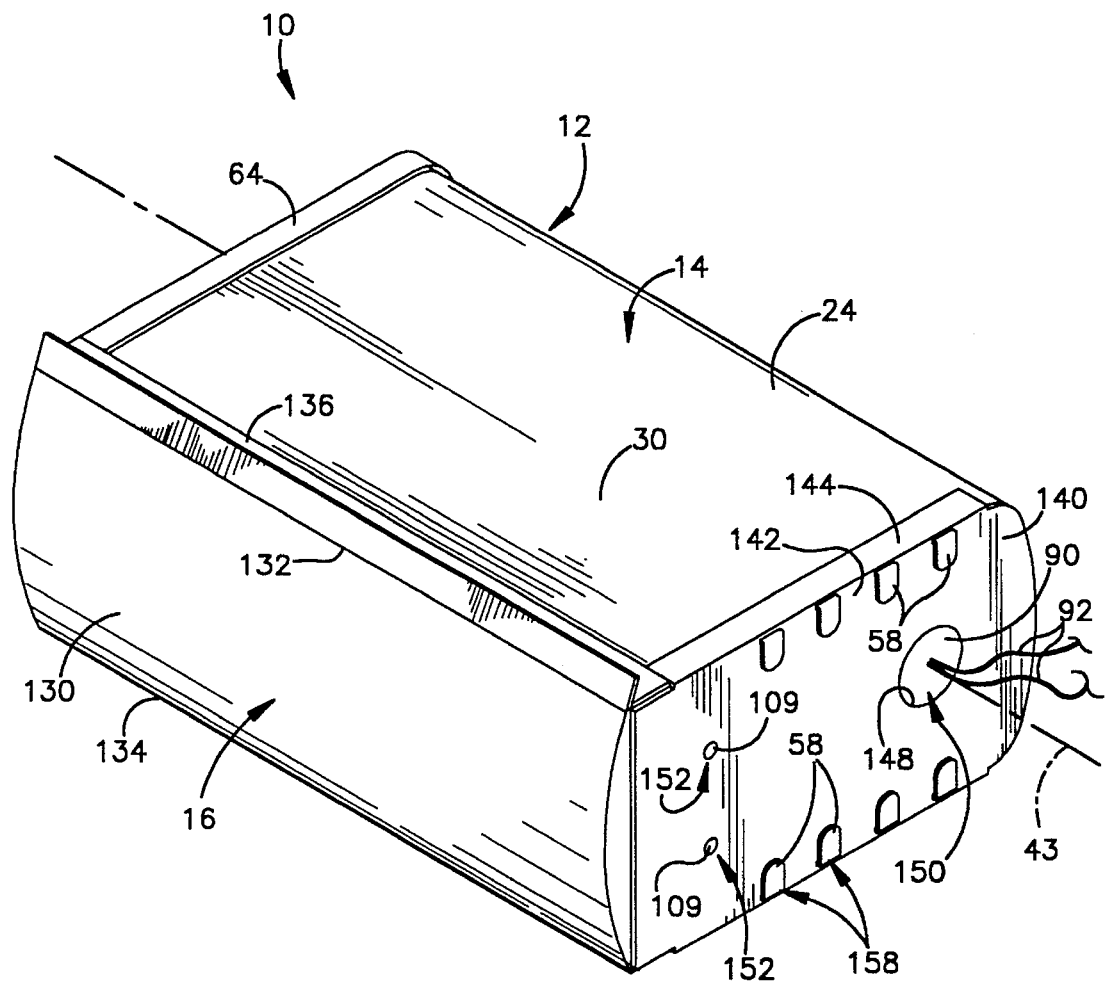
FIG. 1 is a perspective view of a vehicle occupant restraint apparatus comprising a first embodiment of the present invention.

A vehicle occupant restraint apparatus 10 comprising a first embodiment of the present invention is shown in FIG. 1. The apparatus 10 is an air bag module, and includes a canister 14 with a cover 16. The canister 14 contains an inflator 18 and a restraint assembly 20, both of which are shown in FIG. 2. The restraint assembly 20 includes an inflatable vehicle occupant restraint 22 which is commonly referred to as an air bag.

The canister 14 has a main wall 24, a first side wall 26 (FIG. 2), and a second side wall 28, each of which is made of stamped sheet metal. The main wall 24 is generally U-shaped and includes an upper panel 30, a lower panel 32, and a rear panel 34, as viewed in FIG. 2. The upper and lower panels 30 and 32 are substantially planar and parallel to each other. The rear panel 34 is slightly arcuate and generally perpendicular to the upper and lower panels 30 and 32.

The upper panel 30 of the main wall 24 has a forward edge surface 40, and the lower panel 32 has a forward edge surface 42. The forward edge surfaces 40 and 42 are parallel to a first axis 43 of the canister 14. The main wall 24 further has first and second opposite side edge surfaces 44 and 46 which extend along the first and second sides of the main wall 24, respectively. The side edge surfaces 44 and 46 are perpendicular to the forward edge surfaces 40 and 42 and to the first axis 43.

The upper panel 30 of the main wall 24 is folded to define an upper tongue 48 and an upper groove 50 adjacent to the forward edge surface 40 of the upper panel 30. The lower panel 32 of the main wall 24 is similarly folded to define a lower tongue 52 and a lower groove 54 adjacent to the forward edge surface 42 of the lower panel 32. The tongues 48 and 52 and the grooves 50 and 54 are elongated in directions parallel to the forward edge surfaces 40 and 42, and extend entirely from the first side edge surface 44 to the second side edge surface 46. The tongues 48 and 52 project from the upper and lower panels 30 and 32 in directions toward each other, and are substantially rectangular in cross-section. The grooves 50 and 54 are defined by recessed surfaces 55 and 56, respectively, and are open in directions facing away from each other. Moreover, the grooves 50 and 54 are substantially L-shaped in cross-section.

A plurality of tabs 58 extend from the first side edge surface 44 of the main wall 24 in a direction parallel to the first axis 43. Specifically, the tabs 58 are extending segments of the main wall 24, as shown in FIG. 2. The main wall 24, with the tabs 58, is a single piece. Thus, the tabs 58 are integral with the panels of the main wall 24. The tabs 58 are spaced from each other along the first side edge surface 44 at the upper panel 30 and the lower panel 32. In the preferred embodiment of the present invention shown in FIGS. 1 and 2, there are four of the tabs 58 at the upper panel 30 and four of the tabs 58 at the lower panel 32.

The first side wall 26 of the canister 14 is closely received between the panels 30, 32 and 34 of the main wall 24 adjacent to the first side edge surface 44, and is fixed to the main wall 24, preferably by a weld (not shown). The first side wall 26 thus extends fully between the upper and lower panels 30 and 32, and further extends partly from the rear panel 34 to the forward edge surfaces 40 and 42. An annular inner edge surface 60 of the first side wall 26 defines a first side opening 62 in a circular shape centered on the first axis 43.

The second side wall 28 of the canister 14 has a planar portion 63 and a flange portion 64. The periphery of the planar portion 63 follows the U-shaped contour of the main wall 24 adjacent to the second side edge surface 46. An annular inner edge surface 65 of the planar portion 63 defines a fastener opening 66 centered on the axis 43. A smaller annular inner edge surface 67 of the planar portion 63 defines an alignment opening 68 spaced radially from the fastener opening 66. The flange portion 64 extends along the periphery of the planar portion 63, and partially overlaps the main wall 24. The second side wall 28 is fixed to the main wall 24, preferably by a weld (not shown) between the flange portion 64 and the main wall 24.

The walls 24, 26, and 28 of the canister 14 define a chamber 70 within the canister 14. The walls 24, 26, and 28 of the canister 14 further define a deployment opening 72 and a second side opening 74. The deployment opening 72 extends vertically, as shown in FIG. 2, between the upper and lower panels 30 and 32 of the main wall 24, and extends horizontally from the second side wall 28 to the first side edge surface 44 of the main wall 24. The deployment opening 72 thus faces outward from the chamber 70 in a forward direction along a second axis 75 of the canister 14 which is perpendicular to the first axis 43. The second side opening 74 also extends vertically between the upper and lower panels 30 and 32, and extends horizontally from the first side wall 26 to the forward edge surfaces 40 and 42 of the main wall 24. The second side opening 74 is thus spaced from the first side opening 62 in the forward direction, and faces outward from the chamber 70 in a sideways direction parallel to the first axis 43.

The inflator 18 comprises a source of inflation fluid for inflating the air bag 22 and may contain, for example, an ignitable gas generating material and/or a quantity of stored inflation fluid, as known in the art. As shown in FIG. 2, the inflator 18 comprises an elongated cylindrical body 76 with a longitudinal central axis 78, a first circular end wall 80, and a second circular end wall 82. A threaded mounting stud 84 projects from the second end wall 82 at a location centered on the axis 78. An alignment pin 86 projects axially from the second end wall 82 at a location spaced radially from the mounting stud 84. A plurality of fluid outlet openings 88 are arranged on the cylindrical body 76 in an array which extends along nearly the entire length of the cylindrical body 76 and which further extends partly around the circumference of the cylindrical body 76.

The inflator 18 further includes a squib 90. The squib 90 is actuated upon the passage of electric current along electrical lines 92 which extend from the squib 90 through an opening 94 at the center of the first end wall 80. The inflator 18 is actuated upon actuation of the squib 90, and then provides inflation fluid which is directed radially outward through the fluid outlet openings 88. Alternatively, the inflator 18 could comprise a different structure known in the art, such as, for example, a cylindrical pressure vessel with an outlet manifold at one end.

The inflator 18 is receivable in an installed position in the canister 14. Specifically, the inflator 18 is movable longitudinally into the chamber 70 in the canister 14 along the first axis 43 of the canister 14, with the cylindrical body 76 of the inflator 18 being received coaxially through the first side opening 62 in the first side wall 26 of the canister 14. The inflator 18 reaches its installed position when the second end wall 82 of the cylindrical body 76 reaches the second side wall 28 of the canister 14. The mounting stud 84 on the inflator 18 is then received through the fastener opening 66 in the second side wall 28, and the alignment pin 86 is received through the alignment opening 68. The alignment pin 86 and the alignment opening 68 are arranged so that the fluid outlet openings 88 on the cylindrical body 76 face forward in the canister 14 toward the deployment opening 72 when the inflator 18 is in its installed position.

Additionally, the cylindrical body 76 of the inflator 18 fits closely in the first side opening 62 when the inflator 18 is in its installed position in the canister 14. The inflator 18 is thus supported by both the first and second side walls 26 and 28 of the canister 14. A threaded nut 96 or the like is then received on the mounting stud 84 so as to fasten the inflator 18 in its installed position.

The restraint assembly 20 includes a rectangular support frame 100 in which the air bag 22 is contained in a folded, uninflated configuration. The support frame 100 has a forward side 102, a rear side 104, and first and second opposite ends 106 and 108. The support frame 100 is open at the first end 106, as shown in FIG. 2, and is likewise open at the second end 108. A pair of alignment pins 109 project from the first end 106 of the support frame 100.

A forward edge surface 110 of the support frame 100 defines a rectangular opening 112 at the forward side 102 of the support frame 100. A rear edge surface 114 similarly defines a rectangular opening 116 at the rear side 104. The folded air bag 22 is contained substantially entirely in the support frame 100 between the openings 112 and 116, but may protrude a short distance outward from the opening 112 at the forward side 102. A protective wrap 117 extends over the opening 112. The protective wrap 117 may comprise any suitable structure known in the art, such as a plastic film, and is secured to the support frame 100 in a known manner, such as by an adhesive.

The air bag 22 further has an open inner end portion 118 in fluid communication with the opening 116 at the rear side 104 of the support frame 100. The open inner end portion 118 of the air bag 22 contains a peripheral retainer strip 119 of known construction, and is fixed to the support frame 100 by a plurality of fasteners 120 which engage the retainer strip 119 in a known manner. Alternatively, the air bag 22 could be fixed to the support frame 100 by any other suitable structure known in the art.

As further shown in FIG. 2, the support frame 100 has upper and lower recessed surfaces 122 and 124 which define upper and lower grooves 126 and 128, respectively. The upper and lower grooves 126 and 128 are parallel to each other and extend along the length of the support frame 100 between the opposite ends 106 and 108.

Like the inflator 18, the restraint assembly 20 is receivable in an installed position in the chamber 70 in the canister 14. The restraint assembly 20 is movable to its installed position longitudinally through the second side opening 74 in a sideways direction parallel to the first axis 43. When the restraint assembly 20 is thus moved into the chamber 70, the upper and lower grooves 126 and 128 on the support frame 100 receive the upper and lower tongues 48 and 52 on the canister 14, respectively. The recessed surfaces 122 and 124 defining the grooves 126 and 128 then slide longitudinally along the tongues 48 and 52. The support frame 100, which contains the air bag 22, is thus guided to move longitudinally into the chamber 70 in sliding contact with the canister 14. The restraint assembly 20 reaches its installed position when the second end 108 of the support frame 100 reaches the second side wall 28 of the canister 14. The mating tongues 48 and 52 and grooves 126 and 128 then block movement of the restraint assembly 20 relative to the canister 14 in directions transverse to the first axis 43.

The cover 16 is preferably formed of a molded plastic material, and includes a rectangular deployment door 130. A hinge line 132 is formed in the material of the cover 16. The hinge line 132 extends along the length of the deployment door 130 and defines the upper edge of the deployment door 130. A rupturable score line 134 also is formed in the material of the cover 16. The score line 134 also extends along the length of the deployment door 130, and defines the lower edge of the deployment door 130. The cover 16 could alternatively have a different arrangement of hinge and/or score lines for defining a differently shaped deployment door, as known in the art.

The cover 16 further includes upper and lower tongues 136 and 138. Each of the tongues 136 and 138 projects transversely from the rear side of the cover 16 and extends longitudinally along the entire length of the cover 16. Moreover, each of the tongues 136 and 138 has an L-shaped configuration which is reversed relative to the configuration of the other tongue 138 or 136. The upper and lower tongues 136 and 138 are thus designed to slide longitudinally into the upper and lower grooves 50 and 54 in the canister 14, and thereby to guide longitudinal movement of the cover 16 to a covering position in a sideways direction parallel to the first axis 43 of the canister 14. When the cover 16 is in the covering position, as shown in FIG. 1, the deployment door 130 extends over the deployment opening 72 in the canister 14.

The canister 14 further includes a closure wall 140. As shown in FIG. 2, the closure wall 140 has a main portion 142 and upper and lower flanges 144 and 146. The main portion 142 of the closure wall 140 has the size and peripheral shape of the planar portion 63 of the second side wall 28 of the canister 14. The main portion 142 of the closure wall 140 further has an annular inner edge surface 148 defining a circular access opening 150. A pair of smaller annular inner edge surfaces 152 of the main portion 142 define a pair of alignment openings 154. A plurality of rectangular inner edge surfaces 156 of the main portion 142 define a plurality of rectangular slots 158 adjacent to the flanges 144 and 146.

When the inflator 18, the retainer assembly 20 and the cover 16 have been moved to their installed positions as described above, the closure wall 140 is moved to a closed position. As indicated in FIG. 2, the closure wall 140 is movable toward the canister 14 in a sideways direction parallel to the first axis 43 of the canister 14. As the closure wall 140 approaches the canister 14, the tabs 58 on the canister 14 are received through the slots 158 in the closure wall 140. Additionally, the alignment pins 109 on the restraint assembly 20 are received through the alignment openings 154 in the closure wall 140.

The closure wall 140 reaches its closed position, as shown in FIG. 1, when the main portion 142 of the closure wall 140 reaches the first side edge surface 44 on the canister 14. The upper and lower flanges 144 and 146 on the closure wall 140 then overlap the upper and lower panels 30 and 32 on the canister 14, respectively, and the main portion 142 of the closure wall 140 extends across the side openings 62 and 74 in the canister 14. The access opening 150 is thus aligned with the opening 94 in the inflator 18 to enable the electrical lines 92 to extend outward from the canister 14 through the access opening 150.

When the closure wall 140 is located in the closed position, the tabs 58 are bent into the fastening positions in which they are shown in FIG. 1. The tabs 58 then block movement of the closure wall 140 from the closed position. The closure wall 140, in turn, blocks movement of the inflator 18 and the restraint assembly 20 from their installed positions, and also blocks movement of the cover 16 from the covering position. The air bag module 10 is thus assembled without the use of rivets, screws, or other such fasteners for fastening the restraint assembly 20, the cover 16, the closure wall 140 and the canister 14 to each other.

When the air bag module 10 has been assembled as described above, it is installed in a vehicle at a location adjoining the vehicle occupant compartment, such as in the instrument panel of the vehicle. The deployment door 130 then faces the vehicle occupant compartment and conceals the other parts of the module 10 from the vehicle occupant compartment. When the vehicle experiences a condition indicating the occurrence of a collision for which inflation of the air bag 22 is desired, the inflator 18 is actuated by an electrical actuation signal on the electrical lines 92. Such a collision-indicating condition may comprise, for example, the occurrence of a predetermined amount of vehicle deceleration. Inflation fluid is then directed to flow radially outward from the inflator 18 and into the chamber 70 through the fluid outlet openings 88.

The inflation fluid emerging from the inflator 18 flows through the opening 116 at the rear side of the support frame 100 and into the air bag 22 to inflate the air bag 22. As the inflation fluid inflates the air bag 22, it expands the air bag 22 in the forward direction toward the cover 16. The inflation fluid thus moves the air bag 22 forcefully against the protective wrap 117 at the forward side of the restraint assembly 20, and further moves the air bag 22 forcefully against the deployment door 130 on the cover 16. The protective wrap 117 and the cover 16 both rupture under the stress induced by the pressure of the inflation fluid in the air bag 22. The protective wrap 117 is relatively weak, as compared with the cover 16, and ruptures substantially entirely in a random pattern. The cover 16 ruptures at the score line 134 and releases the deployment door 130 to be moved pivotally about the hinge line 132 by the inflating air bag 22 as the air bag 22 emerges from the canister 14 through the deployment opening 72. The air bag 22 is thus inflated into the vehicle occupant compartment to restrain an occupant of the vehicle from forcefully striking the instrument panel or other parts of the vehicle.

An air bag module 200 comprising a second embodiment of the present invention is shown in FIG. 3. The module 200 includes a canister 202 which contains an inflator 204. The module 200 further includes a restraint assembly 206 and a cover 208.

As indicated by the use of the same reference numbers in FIGS. 2 and 3, the inflator 204 in the second embodiment of the invention is structurally the same as the inflator 18 in the first embodiment of the invention. The canister 202 in the second embodiment is substantially similar to the canister 14 in the first embodiment, and thus has a chamber 210 which is defined by a generally U-shaped main wall 212 and first and second opposite side walls 214 and 216. The canister 202 further has a deployment opening 218 and a side opening 220, each of which is substantially similar to its counterpart in the canister 14.

The canister 202 differs from the canister 14 in that the first side wall 214 of the canister 202 is moved to its assembled position at the first side of the main wall 212 after, rather than before, the inflator 204 has been received in the chamber 210. Specifically, the side opening 220 extends fully across first side of the canister 202 within the periphery of the main wall 212 before the first side wall 214 is moved to its assembled position. The inflator 204 is then moved longitudinally into the chamber 210 through the side opening 220 along an axis 224 of the canister 202. The first side wall 214 is subsequently moved to its assembled position. A cylindrical cup portion 226 of the first side wall 214 then fits closely over the adjacent end portion of the inflator 204 so as to support the inflator 204 in its installed position centered on the axis 224. The electrical lines 92 extend outward from the inflator 204 through a central opening 228 in the cup-shaped portion 226 of the first side wall 214. Like the first side wall 26 of the canister 14 described above, the first side wall 214 of the canister 202 is fixed in place, preferably by a weld (not shown).

The canister 202 further differs from the canister 14 in that the canister 202 does not have tongues as well as grooves, but instead has a pair of inner grooves 230 and a pair of outer grooves 232. The outer grooves 232 are open in directions facing toward each other across the chamber 210, and extend longitudinally between the opposite sides of the canister 202 adjacent to the deployment opening 218. The inner grooves 230 also are open in directions facing toward each other across the chamber 210, and extend longitudinally between the opposite sides of the canister 202 at locations spaced inward from the outer grooves 232.

The restraint assembly 206 includes a support frame 240 and an air bag 242. The support frame 240 is a rectangular panel with a rectangular opening 246. A pair of rupturable tie lines 248 hold the air bag 242 against the support frame 240 in a folded, uninflated condition. An open inner end portion (not shown) of the air bag 242 is fixed to the support frame 240 in fluid communication with the opening 246. The inner end portion of the air bag 242 may be fixed to the support frame 240 by any suitable fastening structure known in the art.

As indicated in FIG. 3, the restraint assembly 206 is moved into engagement with the canister 202 in a sideways direction parallel to the axis 224 of the canister 202. The support frame 240 is received in the inner grooves 230 in the canister 202 upon such movement of the restraint assembly 206. The restraint assembly 206 is thus guided to move longitudinally into the chamber 210 through the side opening 220 as the support frame 240 slides against the canister 202 within the inner grooves 230. The restraint assembly 206 reaches an installed position when the support frame 240 reaches the second side wall 216 of the canister 202. The air bag 242 and the support frame 240 then take the positions in which they are shown in FIG. 4.

The cover 208 has a deployment door portion 250, an upper tongue 252, and a lower tongue 254. The tongues 252 and 254 on the cover 208 are designed to slide longitudinally into the outer grooves 232 in the canister 202. The tongues 252 and 254 and the outer grooves 232 are thus designed to guide longitudinal movement of the cover 208 into engagement with the canister 202 in a sideways direction parallel to the axis 224. The cover 208 is thus movable to an installed position in which it covers the deployment opening 218 to conceal the restraint assembly 206, as shown in FIG. 4.

As shown in FIG. 3, the canister 202 further includes a closure wall 260. The closure wall 260 has a closed position in which a pair of tabs 264 on the closure wall 260 overlap opposed portions of the main wall 212 of the canister 202. A pair of opposed fastener openings 266 in the tabs 264 are then aligned with a pair of opposed fastener openings 268 located in the canister 202 between the grooves 230 and 232. A pair of screws 270, or any other suitable fasteners, are received through the aligned fastener openings 266 and 268 to fasten the closure wall 260 in the closed position.

An air bag module 300 comprising a third embodiment of the present invention is shown in FIG. 5. The module 300 includes a canister 302, an inflator 304, and a restraint assembly 306. The canister 302 in the third embodiment receives and supports the inflator 304 in an installed position centered on an axis 306 in a chamber 308, and does so in substantially the same manner that the canister 202 in the second embodiment receives and supports the inflator 204 in an installed position centered on the axis 224 in the chamber 210. The module 300 differs from the module 200 primarily in the structure of the restraint assembly 306, and in the manner in which the restraint assembly 306 is received and supported in an installed position engaged with the canister 302.

The restraint assembly 306 includes a support frame 310, an air bag 312, and a cover 314. The support frame 310 is a rectangular panel with a rectangular opening 316. The cover 314 has a rectangular body 318 which defines a rupturable deployment door 320. The body 318 of the cover 314 further defines a rectangular compartment 322 with an open inner end 324. A pair of tongues 326 project from opposite ends of the cover 314.

An outer end portion 330 of the air bag 312 is received in the compartment 322 in the cover 314 in a folded, uninflated configuration. An inner end portion 332 of the air bag 312 extends from the outer end portion 330 to the support frame 310, and is fixed to the support frame 310 in fluid communication with the opening 316. The inner end portion 332 of the air bag 312 may be fixed to the support frame 310 by any suitable structure known in the art.

The canister 302 defines a forward-facing deployment opening 340 and includes a pair of guide structures 342. The guide structures 342 are elongated vertically, and are located outward of the chamber 308 at the opposite sides of the canister 302. Each of the guide structures 342 defines an inner groove 344 and an outer groove 346. The grooves 344 and 346 are open in directions facing toward each other across the deployment opening 340.

As indicated in FIG. 5, the restraint assembly 306 is moved transversely into engagement with the canister 302 in a vertical direction perpendicular to the axis 306. The support frame 310 is received in the inner grooves 344 in the guide structures 342, and the tongues 326 on the cover 314 are received in the outer grooves 346 in the guide structures 342. The restraint assembly 306 is thus guided toward an installed position as the support frame 310 and the tongues 326 slide against the canister 302 in the grooves 344 and 346. The restraint assembly 306 reaches its installed position when the opening 316 in the support frame 310 moves fully into fluid communication with the deployment opening 340 in the canister 302. In accordance with a specific feature of the present invention, the inflator assembly 306 is fastened in its installed position by crimping of the guide structures 342 so as to clamp the support frame 310 and the tongues 326 in the grooves 344 and 346, respectively.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a canister, said canister having wall means for defining a chamber, a side opening facing outward from said chamber in a first direction, and a deployment opening facing outward from said chamber in a second direction perpendicular to said first direction;

an inflator structure having means for directing inflation fluid into said chamber, said inflator structure being movable to an installed position in said chamber from said first direction through said side opening; and a restraint assembly including an inflatable vehicle occupant restraint and support means for supporting said restraint in fluid communication with said inflator structure, said restraint assembly having an installed position engaged with said canister, said restraint being expandable from said deployment opening in said second direction upon inflation of said restraint when said restraint assembly is in said installed position;

said canister and said support means having cooperating means for guiding movement of said restraint assembly to said installed position in sliding contact with said canister in a third direction perpendicular to said second direction;

said wall means including a wall portion having a bendable tab formed as one piece with said wall portion;

said canister further including a closure wall having means for defining a slot, said closure wall being receivable in a closed position in which said closure wall blocks movement of said inflator structure and said restraint assembly from said installed positions, said tab being receivable through said slot and being bendable into a fastening position in which said tab retains said closure wall in said closed position;

said wall means including a side wall of said canister which has an annular inner edge surface defining said side opening in a circular shape, said closure wall extending across said side opening when said closure wall is in said closed position.

2. Apparatus as defined in claim 1 wherein said canister further has means for defining an additional side opening through which said restraint assembly is movable to said installed position in said third direction, said additional side opening being spaced from said side opening in said second direction, said closure wall extending across said additional side opening when said closure wall is in said closed position.

* * * * *